United States Patent
Armstrong et al.

(10) Patent No.: US 6,304,170 B1
(45) Date of Patent: Oct. 16, 2001

(54) ALERTING APPARATUS

(75) Inventors: Andrew Armstrong, Hounslow; Steve Mote, Charlton Musgrove, both of (GB)

(73) Assignee: Nokia Mobiles Phones Limited, Espoo (FI)

( * ) Notice: Subject to any disclaimer, the term of this patent is extended or adjusted under 35 U.S.C. 154(b) by 0 days.

(21) Appl. No.: 09/427,625

(22) Filed: Oct. 27, 1999

(30) Foreign Application Priority Data

Nov. 6, 1998 (GB) .................................................. 9824422

(51) Int. Cl.[7] ...................................................... H04B 3/36
(52) U.S. Cl. ................ 340/407.1; 340/7.22; 340/825.36; 310/81; 379/373; 455/567
(58) Field of Search ............................. 340/407.1, 404.2, 340/390.1, 391.1, 825.36, 7.22; 310/81; 381/287, 490; 455/567, 90, 412, 575; 379/37, 41, 164, 179, 433, 373

(56) References Cited

U.S. PATENT DOCUMENTS

| | | | |
|---|---|---|---|
| 3,911,416 | 10/1975 | Feder | 340/311 |
| 4,707,855 | 11/1987 | Pasinski et al. | |
| 4,974,392 | 12/1990 | Selinko | 340/825.4 |
| 5,327,486 | * 7/1994 | Wolff et al. | 379/96 |
| 5,439,408 | * 8/1995 | Wilkinson | 446/409 |
| 5,497,506 | * 3/1996 | Takeysu | 455/89 |
| 5,533,920 | * 7/1996 | Arad et al. | 446/409 |
| 5,642,413 | * 6/1997 | Little | 379/373 |
| 5,683,284 | * 11/1997 | Christen | 446/233 |
| 5,801,466 | 9/1998 | Odagiri et al. | 310/81 |

FOREIGN PATENT DOCUMENTS

| | | |
|---|---|---|
| 2765431 | 12/1998 | (FR) . |
| 63272148 | 11/1988 | (JP) . |
| 01103344 | 4/1989 | (JP) . |
| 03013151 | 1/1991 | (JP) . |

* cited by examiner

Primary Examiner—Edward Lefkowitz
Assistant Examiner—Davetta W. Goins
(74) Attorney, Agent, or Firm—Antonelli, Terry, Stout & Kraus, LLP

(57) ABSTRACT

An information processing apparatus with a first axis of rotation, including a surface upon which the information processing apparatus may be supported, and a motor. The motor has a rotor shaft with a second axis of rotation. The motor is activated to alert a user of the apparatus to an event. The motor is positioned within the information processing apparatus such that the second axis of rotation is substantially parallel to the first axis of rotation, and activation of the motor produces a turning moment, causing the information processing apparatus to rotate about the first axis. The information processing apparatus can be a portable radio-telephone or a portable computer.

13 Claims, 4 Drawing Sheets

ALERTING APPARATUS

BACKGROUND OF THE INVENTION

This invention relates to an alerting device for electronic equipment. It is particularly suitable for use in a portable radiotelephone to alert the user to an incoming call.

Traditionally, a portable radiotelephone or mobile station (MS) alerts the user to an event such as an incoming call or text message (SMS), through use of an audible tone. A great variety of tones are normally provided, allowing the user to customise his alert so that it can be easily identified from amongst other telephone alerts. 'Incoming call' herein includes an incoming message.

Such tones can, however, be intrusive and annoying to people in close proximity to the intended recipient. Currently available portable radiotelephones often come equipped with the option of a vibrating alert instead of, or as well as, the traditional audible alert. The vibrating alert causes the telephone to vibrate, and is designed to discreetly inform the user of an incoming call, if the telephone is, for instance, in the user's pocket. The vibrations can be sensed by the user without the need for an intrusive, audible tone.

The vibrating alert solution is not always appropriate, as the user must be in close physical contact with the telephone in order for the vibrations to be noticed. There are often situations in which the user will not be in physical contact with the telephone, but will wish to be alerted to an incoming call without disturbing others with an audible tone. For instance, a telephone may normally be kept in a handbag or a briefcase, where the volume of an audible tone may be disruptive, but a vibrating alert will be ineffective.

In addition to the aforementioned alerting methods, some telephones are equipped with a small light, such as an LED, which may alternatively, or additionally, be used to signal an incoming call. However, such an alert may not be noticed, unless the telephone is at all times clearly visible. It is especially easy to miss such an alert in a brightly lit environment.

Prior art techniques of notifying the user of an incoming call either require the telephone to produce an audible tone which may disturb others, vibrate, which requires the user to be in physical contact with the telephone, or activate an LED which is easily missed, unless the telephone is constantly within the user's field of vision.

Similar problems are encountered with other portable electronic equipment. For instance, portable electronic organisers or PDAs (Personal Digital Assistants) are often equipped to alert the user in response to a pre-programmed diary reminder for instance. The audible alert can cause similar problems in this situation. 'Portable computer' will herein include laptop computers, PDAs, personal organisers, data capture devices and the like.

It is notable that many portable radiotelephones now include many of the features of portable computers.

It is desired to produce a portable electronic apparatus which may alert a user to an event, in a manner which avoids the above mentioned disadvantages.

It is particularly desired to produce a portable radiotelephone which may alert a user to an incoming call, in a manner which avoids the above mentioned disadvantages.

SUMMARY OF THE INVENTION

According to the first aspect of the present invention, there is provided an information processing apparatus having a first axis of rotation, comprising a surface upon which the apparatus may be supported, and a motor, said motor comprising a rotor shaft having a second axis of rotation, the motor being activated in order to alert a user of the apparatus to an event, wherein said motor is positioned within the apparatus such that the second axis of rotation is substantially parallel to the first axis of rotation, and activation of the motor produces a turning moment causing the apparatus to rotate about the first axis.

The information processing apparatus may be a portable radiotelephone. The telephone is made to spin about an axis when the internal motor is activated. The principle of conversation of angular momentum ensures that all moving parts can be kept internal to the telephone housing.

The event may be an incoming telephone call or message. A user of the telephone is thus made aware of the call without any intrusive and distracting audible alerts. Neither does he need to be in physical contact with the telephone.

The information processing apparatus may be a portable computer. Portable computers are often used to remind a user of an upcoming appointment, and can potentially distract others with such audible reminders. Portable computers adapted according to the invention can alert the user discreetly.

The apparatus may be made to rotate about an axis orthogonal to, or parallel to, the structure, e.g. a table, upon which it is resting. The axis is defined by the positioning within the apparatus of the rotor shaft of the motor. Angular momentum is a vector quantity, and so the rotation induced in the apparatus is in the same direction as the rotation of the rotor shaft.

The apparatus may rest upon any one of its suitable surfaces. It is preferable that the surface used is curved. This combines a small contact area with the supporting structure, with a pleasing look and feel.

Alternatively, or in addition, a surface may be provided with a projection upon which it may be made to rotate.

Rather than replacing an audible alert, the alert may be activated synchronous to such an audible alert. Thus, the apparatus will appear to rotate in time to the audible alert. With the various ring tones which are commonly provided with portable radiotelephones, the telephone may appear to 'dance' in time to the ring tone.

The motor may be a vibrator motor. Such a motor offers the additional benefit that the apparatus may additionally make use of a vibrating alert.

The motor may be operable in two opposing, i.e. forward and backward, directions. Apparatus so equipped may be made to oscillate about the axis of rotation.

It is an advantage of the present invention that a user of an apparatus according to the invention may be alerted to an event concerning the apparatus in a manner which is both easily noticeable, yet relatively nondisruptive to others.

It is a particular advantage of the present invention, that a user of a portable radiotelephone may be alerted to an incoming call in a manner which is both easily noticeable, yet relatively non-disruptive to others.

BRIEF DESCRIPTION OF THE DRAWINGS

For a better understanding of the present invention, and to understand how the same may be brought into effect, the invention will now be described, by way of example only, with reference to the appended drawings in which.

DETAILED DESCRIPTION

Figure 1:
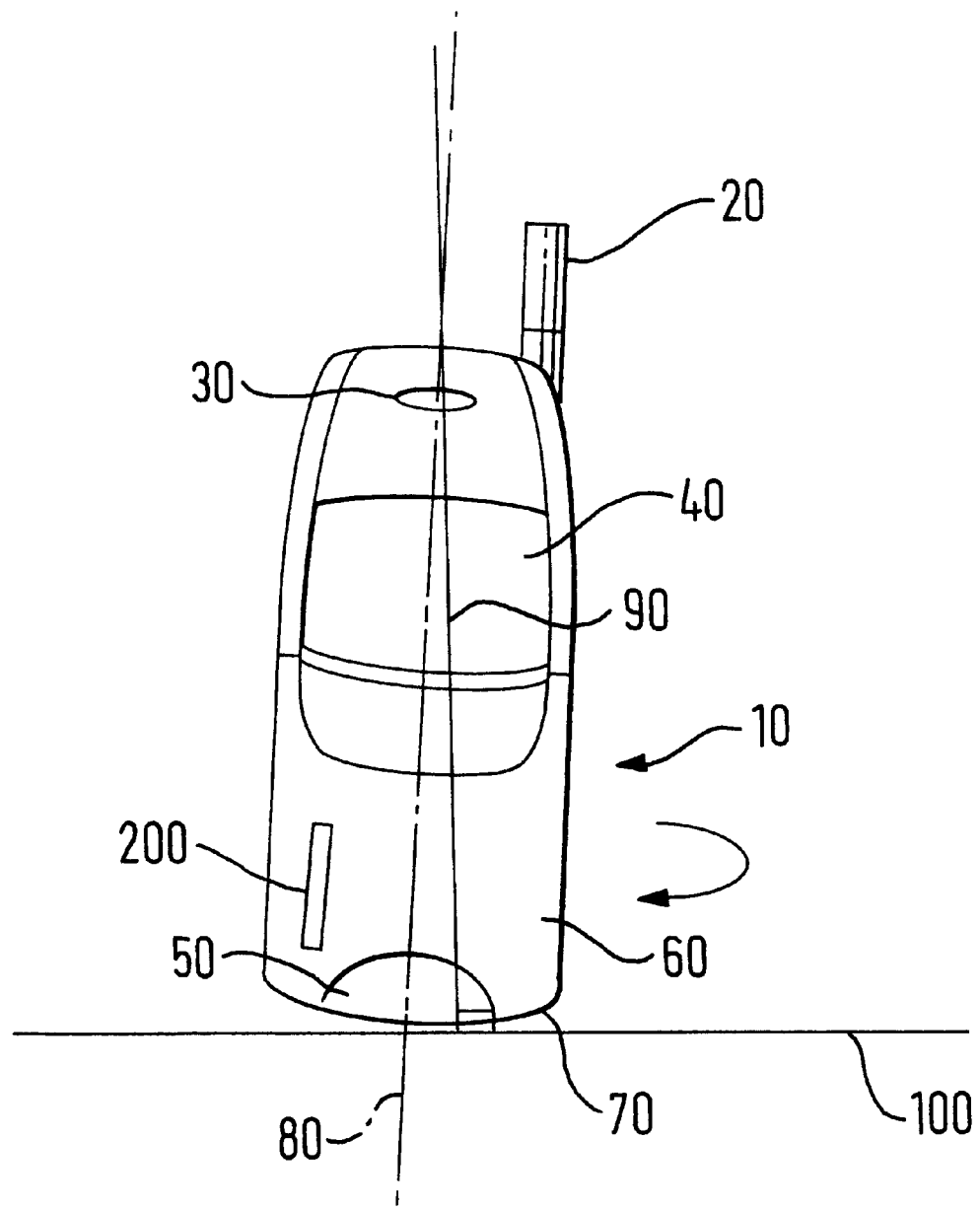
FIG. 1 shows a portable radiotelephone in accordance with the invention.

Referring to FIG. 1, a portable radiotelephone 10 is shown standing on its lower surface 70. In this particular embodiment, the telephone 10 leans slightly to one side due to the weight distribution of the various components within the casing. Other embodiments may be envisaged in which the telephone will rest substantially orthogonal to the surface, or supporting structure, 100 upon which the telephone rests.

Illustrated are some of the standard features associated with portable radiotelephones, such as an antenna 20, an earpiece 30, a display 40 and a microphone 50. The keypad in this particular embodiment is concealed behind a sliding cover 60.

The lower surface 70 is slightly curved, allowing the telephone to be conveniently supported on this surface whilst providing a small area of contact with the contacting surface, or supporting structure, 100 such as a desk or table, on which the telephone is placed. The area of contact is kept small, as this is the point about which the telephone will rotate in response to activation of the motor.

In this embodiment, the centre of gravity of the phone is kept as low as possible, to prevent the phone from toppling. This can be achieved by the careful placement within the telephone housing of the various components that make up the telephone. Certain components are heavier than others, e.g. the battery, and are positioned near the lower surface 70 of the telephone.

Also illustrated is the position within the casing of the motor 200. The motor is mounted so that the axis of rotation of the rotor shaft is substantially parallel to the axis of rotation 90 of the telephone.

Figure 2:
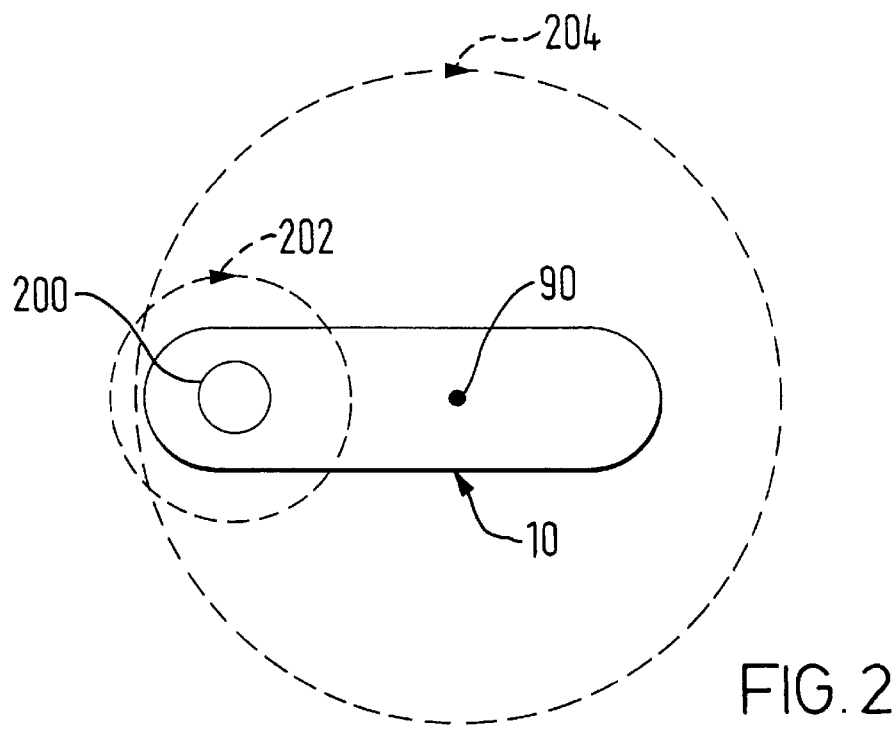
FIG. 2 is a top view of the portable radiotelephone of FIG. 1, showing the rotation of the motor, and of the entire telephone.

FIG. 2 shows a top view of the telephone 10 of FIG. 1. The position of the motor 200 is shown. Its direction of rotation is shown by arrow 202. The corresponding rotation of the telephone about its axis of rotation 90, brought about by the rotation of the motor, is shown by arrow 204.

Figure 3:
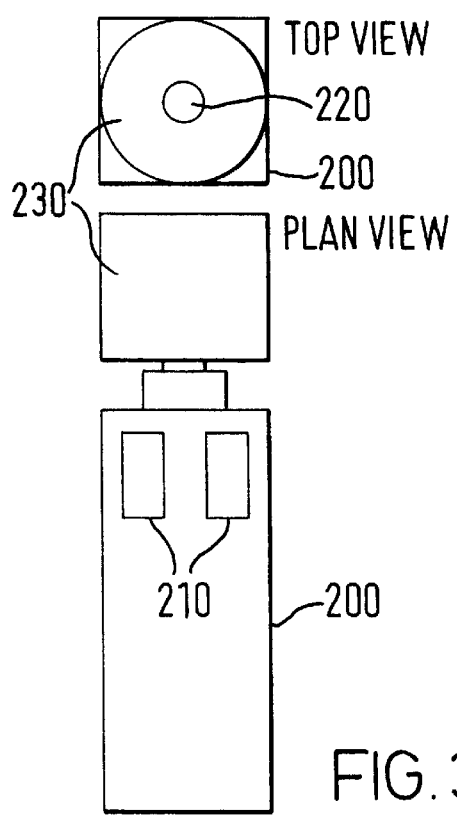
FIG. 3 is a top and plan view of a motor suitable for use in a device according to one embodiment of the invention.

FIG. 3 shows a top and plan view of the motor 200. The motor assembly comprises a standard DC motor, which is made to rotate in response to an incoming call. The motor is activated by the appliance of a DC voltage to electrical terminals 210. The rotor shaft 220 of the motor is shown loaded with a weight 230 to give the arrangement a greater moment of inertia. The addition of a weight may not be necessary depending on the mass, and moment of inertia, of the entire telephone.

The motor of this embodiment measures 20 mm×7 mm×5 mm, and hence can be easily incorporated into the housing without using too much of the limited space available. Other features of note of the motor are:

Rated Voltage: 1.3V
Rated Speed: 10,000 rpm (+3,000, −2,000 rpm)
Rated Current: 80 mA With the telephone 10 standing upright, resting on its lower surface 70, any rotation of the motor 200 will in turn impart a turning moment, or torque, on the telephone 10, due to the principle of conservation of angular momentum. If the moment or torque is of sufficient magnitude, then the telephone 10 will rotate about an axis of rotation 90 defined by the geometry of the telephone 10 and the area of contact with the contacting surface 100.

In FIG. 1, the geometric centre line 80 of the telephone 10 is shown with a dashed line, but note that this is different to the line defining the axis of rotation 90. This is due to the uneven mass distribution within the housing of this particular embodiment. If the mass distribution were altered, then the geometric centre 80 may be made to coincide with the axis of rotation 90 of the telephone 10.

Figure 5:
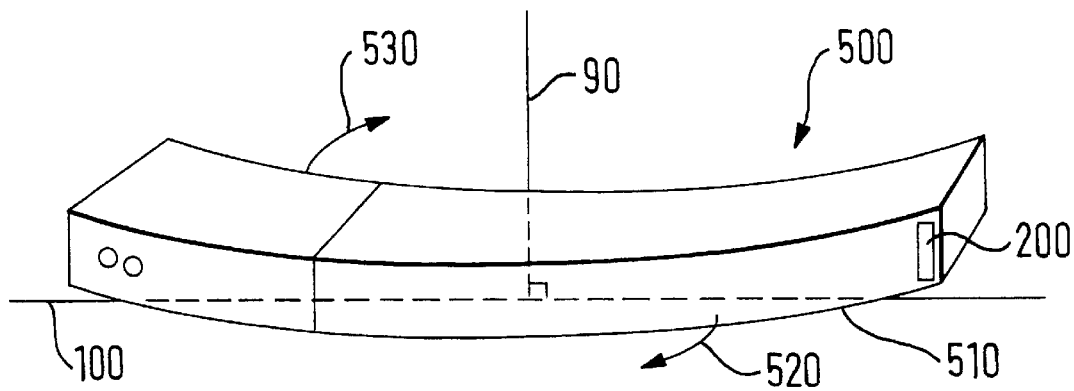
FIG. 5 shows a portable radiotelephone according to a further embodiment of the invention.

There is no reason why the surface upon which the telephone rests needs to be the lower surface. FIG. 5 illustrates an alternative embodiment which shows the telephone 500 resting on its rear surface 510. This embodiment is substantially curved in profile, and resembles the Nokia® 8110 telephone. When placed down on its rear surface 510, as shown, it provides a small contact area with the contacting surface 100. In this embodiment, consideration of the centre of gravity of the telephone is not crucial, as the telephone is less likely to topple.

In this embodiment, the motor 200 is positioned, as shown, so that the axis of rotation of the rotor shaft 220 is substantially orthogonal to the surface 100 upon which the telephone 500 rests, and substantially parallel to the axis of rotation 90 of the telephone. Appliance of a DC voltage to the motor 200, will, as in the previous embodiment, cause the telephone 500 to rotate about an axis 90, due to the conservation of angular momentum. The arrows 520, 530 indicate the direction of rotation of the telephone.

Figure 6:
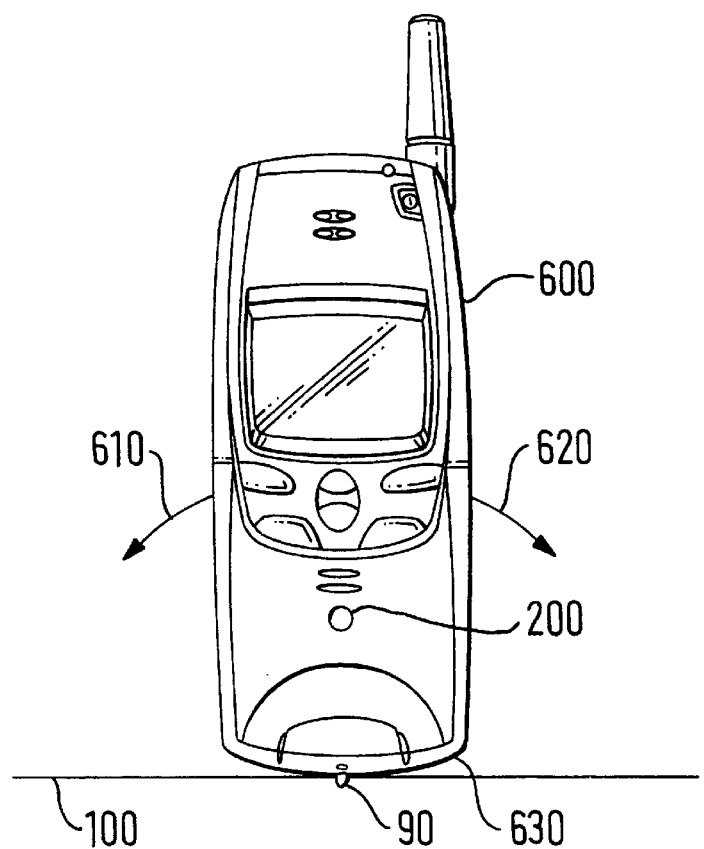
FIG. 6 shows a portable radiotelephone according to yet another embodiment of the invention.

In a further embodiment, it is possible to cause the telephone 600 to rotate about an axis 90 which is substantially parallel to the contacting surface 100 upon which the telephone rests. FIG. 6 shows such an embodiment. Here the axis of rotation 90 is substantially parallel to contacting surface 100, and extends substantially orthogonal to the front of the telephone 600.

In the view shown, the motor 200 is viewed along its rotor shaft 220. If it is activated so that its rotor shaft rotates alternately in two opposite directions, the telephone will appear to oscillate from side to side as indicated by arrows 610, 620. The telephone does not topple at the extremes of the rotation as there is insufficient torque provided by the motor to shift the centre of gravity of the telephone beyond the edge of lower surface 630.

In a further embodiment, it is possible to achieve the effect of a visual indication of an incoming call, i.e. rotation of the telephone, combined with the benefit of a vibrating alert for occasions when the telephone is carried about the person of the user, e.g. in a pocket.

Figure 4:
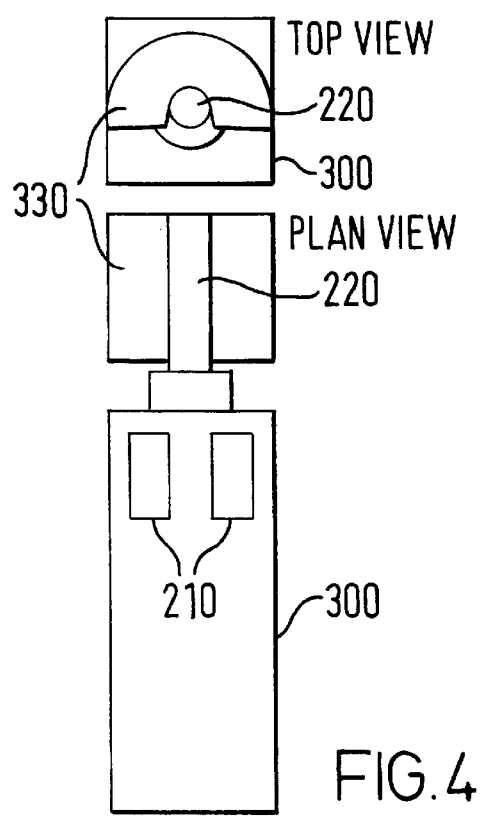
FIG. 4 is a top and plan view of a vibrator motor suitable for use in a device according to another embodiment of the invention.

The regular motor 200 of the previously described embodiment is replaced with the vibrator motor 300 of FIG. 4. The vibrator motor 300 comprises a regular motor, loaded with an eccentric mass 330. This can be seen clearly from the top view of the vibrator motor 300. The weight 330 is concentrated around one portion of the rotor shaft 220. The rotor shaft 220 defines the axis of rotation of the motor. When the motor is activated through the appliance of a DC voltage, the rotor shaft 220 begins to spin, and the telephone rotates about its axis of rotation, as previously described.

If, however, a telephone equipped with a vibrator motor 300 according to an embodiment of the invention is not free to rotate, because it is being carried in a pocket, for instance, then the vibrator motor may still be used to notify the user of an incoming call with a vibrating alert.

All the embodiments herein described may be adapted to use a motor whose rotor shaft is capable of rotating in either direction. Using such a motor, the telephone may be made to rotate in one of two opposite directions. Activation of the motor in a first direction, and then in an opposite direction, synchronous to an audible alert, may be used to make the telephone appear to 'dance' in time to the audible alert.

More than one motor may be fitted to a telephone so that it may rotate in any one of a number of planes. For instance, one motor may be used to cause rotation while the telephone is lying on a rear surface, and another may be used to cause rotation if the telephone is standing upright.

Figure 7:
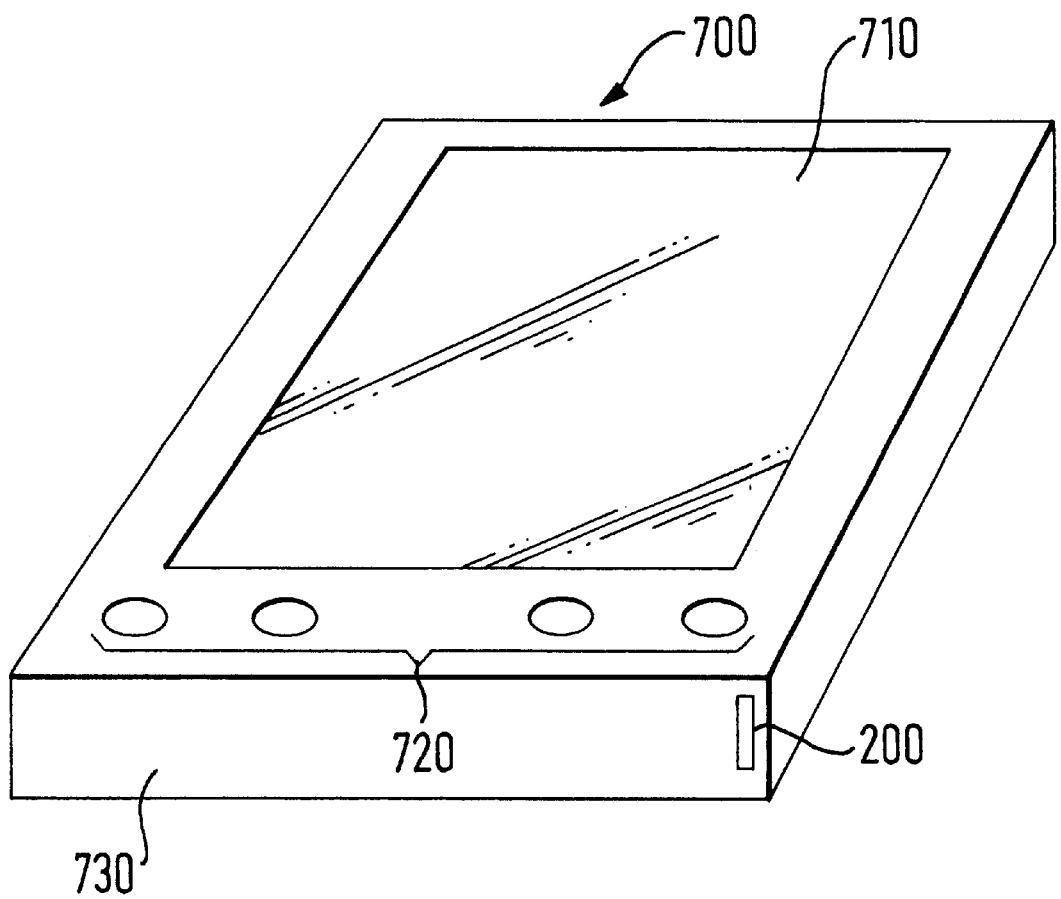
FIG. 7 shows a portable computer according to a still further embodiment of the invention.

FIG. 7 shows a portable computer 700 according to a further embodiment of the invention. The portable computer 700 comprises a touch-sensitive screen 710, where data is entered and displayed. Also shown are several function keys 720, which have special functions. Portable computers such as these are commonly used to store such information as To-Do Lists, personal address books, application programs and schedules or diaries. It is usual to provide an audible tone to alert the user to, for instance, an impending appointment. Incorporation of a motor 200 allows the portable computer to operate in the same manner as the previously described telephones i.e. it may be made to spin about an axis, in response to activation of the motor, in order to discreetly notify the user of an upcoming event. In the embodiment shown, the computer may be supported on its rear surface (not shown), or the lower surface 730.

It will be clear to the skilled man that the present invention is applicable to laptop or palmtop computers, where an alert may be used, for instance, as a reminder of an appointment, notifying arrival of a new email, or as a warning that, for instance, memory may be getting low.

The embodiments herein described may be adapted in many ways while still performing the invention. For instance, the apparatus may be made to rotate about any suitable axis defined in terms of any surface of the apparatus.

The outer surface upon which the apparatus rests need not be curved, but may be provided with a projection upon which the apparatus may be made to rotate.

The present invention includes any novel feature or combination of features disclosed herein either explicitly or any generalization thereof irrespective of whether or not it relates to the claimed invention or mitigates any or all of the problems addressed.

What is claimed is:

1. An information processing apparatus comprising:

a first axis of rotation, a surface upon which the information processing apparatus may be supported, and a motor, said motor comprising a rotor shaft having a second axis of rotation, wherein said motor is activated in order to alert a user of the information processing apparatus to an event, wherein said motor is positioned within the information processing apparatus such that the second axis of rotation is substantially parallel to the first axis of rotation, and activation of the motor produces a turning moment causing the information processing apparatus to rotate about the first axis.

2. An information processing apparatus as claimed in claim 1, wherein the information processing apparatus is a portable radiotelephone.

3. An information processing apparatus as claimed in claim 2, wherein the event is an incoming call or message.

4. An information processing apparatus as claimed in claim 1, wherein the information processing apparatus is a portable computer.

5. An information processing apparatus as claimed in claim 1, wherein the first axis of rotation is substantially orthogonal to a structure support the apparatus.

6. An information processing apparatus as claimed in claim 1, wherein the first axis of rotation is substantially parallel to a structure supporting the information processing apparatus.

7. An information processing apparatus as claimed in claim 1, wherein the surface is curved.

8. An information processing apparatus as claimed in claim 1, wherein the surface is provided with a projection, about which rotation may occur.

9. An information processing apparatus as claimed in claim 1, wherein the surface is a lower surface of the information processing apparatus.

10. An information processing apparatus as claimed in claim 1, wherein the outer surface is a rear surface of the information processing apparatus.

11. An information processing apparatus as claimed in claim 1, wherein the motor is activated synchronous to an audible alert.

12. An information processing apparatus as claimed in claim 1, wherein the motor is a vibrator motor.

13. An information processing apparatus as claimed in claim 1, wherein the motor is capable of operation in two opposing directions.

* * * * *